US010834926B2

(12) United States Patent
Falkowski et al.

(10) Patent No.: US 10,834,926 B2
(45) Date of Patent: Nov. 17, 2020

(54) INSECTICIDE PROPERTIES OF AN EXTRACT OF *SEXTONIA RUBRA*, AND THE CONSTITUENTS THEREOF

(71) Applicants: Centre National de la Recherche Scientifique, Paris (FR); Institut Pasteur, Paris (FR); Université de Guyane, Cayenne (FR); Université des Antilles, Guadeloupe (FR); Guyane Développement Inno, Cayenne (FR)

(72) Inventors: Michaël Falkowski, Aiserey (FR); Alice De Souza Rodrigues, Banyuls-sur-Mer (FR); Véronique Éparvier, Gif-sur-Yvette (FR); Isabelle Dusfour, Rémire-Montjoly (FR); Emeline Houël, Rémire-Montjoly (FR); Didier Stien, Banyuls-sur-Mer (FR)

(73) Assignees: CENTRE NATIONAL DE LA RECHERCHE SCIENTIFIQUE—CNRS, Paris (FR); INSTITUT PASTEUR, Paris (FR); UNIVERSITÉ DE GUYANE, Cayenne (FR); UNIVERSITÉ DES ANTILLES, Guadeloupe (FR); GUYANE DÉVELOPPEMENT INNOVATION, Cayenne (FR)

( * ) Notice: Subject to any disclaimer, the term of this patent is extended or adjusted under 35 U.S.C. 154(b) by 674 days.

(21) Appl. No.: 15/513,874

(22) PCT Filed: Sep. 22, 2015

(86) PCT No.: PCT/FR2015/052537
§ 371 (c)(1),
(2) Date: Mar. 23, 2017

(87) PCT Pub. No.: WO2016/046489
PCT Pub. Date: Mar. 31, 2016

(65) Prior Publication Data
US 2017/0238556 A1 Aug. 24, 2017

(30) Foreign Application Priority Data
Sep. 23, 2014 (FR) ...................... 14 58946

(51) Int. Cl.
A61K 36/54 (2006.01)
A01N 65/24 (2009.01)
A01N 43/08 (2006.01)

(52) U.S. Cl.
CPC ............ *A01N 65/24* (2013.01); *A01N 43/08* (2013.01); *Y02A 50/328* (2018.01)

(58) Field of Classification Search
CPC .................................................. A61K 36/54
USPC ..................................................... 424/775
See application file for complete search history.

(56) References Cited

FOREIGN PATENT DOCUMENTS

FR 2959642 A1 11/2011
WO 2011138570 A1 5/2011

OTHER PUBLICATIONS

Rodrigues et al. The termiticidal activity of Sextonia rubra (Mez) van der Werff (Lauraceae) extract and its active constituent rubrynolide; Pest Manag Sci 2011; 67: 1420-1423. (Year: 2011).*
Rodrigues et al. "The termiticidal activity of Sextonia rubra (Mez) van der Weff (Lauraceae) extract and its active constituent rubrynolide", Pest Management Science, vol. 67; pp. 1420-1423. (Year: 2011).*
Orkin, Termite Larvae, 2019 Orkin, LLC (Year: 2019).*
"Dengue and severe dengue", WHO, downloaded Jun. 6, 2017, p. 1-7, http://www.who.int/mediacentre/factssheets/fs117/en.
"Guidelines for Laboratory and Field Testing of Mosquito Larvicides", OMS (WHO) World Health Organization Communicable Disease Control, Prevention and Eradication Who Pesticide Evaluation Scheme, WHO/CDS/WHOPES/GCDPP/2005.13, 2005, pp. 1-41.
Alice Rodrigues et al. "The termiticidal activity of Sextonia rubra (Mex) van der Werff (Lauraceae) extract and its active constituent rubrynolide", Pest Manag Sci, Society of Chemical Industry, 2011, vol. 67, pp. 1420-1423.
Cameron P. Simmons et al. "Dengue", The New England Journal of Medicine, Apr. 12, 2012, vol. 366, No. 15, pp. 1423-1432.
Cassie C. Jansen et al. "The dengue vector Aedes aegypti: what comes next", Institut Pasteur, Microbes and Infection, 2010, pp. 1-8.
Franca et al "Rubrenolide and Rubrynolide: An Alkene-Alkyne Pair from Nectandra Rubra" Phytochemistry; 1977; vol. 16; 257-262.
Henk Van Der Werff, "*Sextonia*, a New Genus of Lauraceae from South America", Missouri Botanical Garden Press, Novon, 1997, vol. 7, No. 4, pp. 436-439, http://www.jstor.org/stable/3391778.
International Search Report dated May 1, 2016 re: Application No. PCT/FR2015/052537; pp. 1-3; citing: Rodrigues et al., WO 2011/138570 A1, Franca, et al.
Isabelle Dusfour et al. "Multiple insecticide resistance in *Aedes aegypti* (Diptera: Culicidae) populations compromises the effectiveness of dengue vector control in French Guiana", Mem Inst Oswaldo Cruz, May 2011, vol. 106, No. 3, pp. 346-352.
L. Thijs et al. "Rubrnolide, total sythesis and revision of its reported stereochemical structure", Science Direct, Tetrahedron, 2004, vol. 60, pp. 5237-5252.
Written Opinion dated May 1, 2016 re: Application No. PCT/FR2015/052537; pp. 1-5; citing: Rodrigues et al.
Fouque et al. "Quelques aspects de l'histoire, de l'ecologie generale et de la transmission verticale des virus de la dengue", Aedes Aegypti en Guyane Francaise, Bulletin de la Societe de Pathologie Exotique, (1996), English Abstract.
(Continued)

*Primary Examiner* — Michael Barker
*Assistant Examiner* — Deborah A Davis
(74) *Attorney, Agent, or Firm* — Cantor Colburn LLP

(57) ABSTRACT

The invention relates to the use of an extract of *Sextonia rubra* or the constituents thereof, rubrenolide and/or rubrynolide, as an insecticide agent against mosquitoes, especially as a larvicide agent.

5 Claims, No Drawings

(56) References Cited

OTHER PUBLICATIONS

Rodrigues, "Analyse et valorisation bioinspiree des metabolites secondaires a l'origine de la durabilite naturelle des bois exploites de guyane francaise", These de Doctorat, A L'Universite de Brasilia, (2010), English Abstract.

* cited by examiner

INSECTICIDE PROPERTIES OF AN EXTRACT OF *SEXTONIA RUBRA*, AND THE CONSTITUENTS THEREOF

TECHNICAL FIELD

The present invention relates to the use of a novel substance of natural origin with insecticide activity, in particular with respect to pest insects.

In particular, it relates to the use of an extract of sustainable Amazonian wood of the species *Sextonia rubra* (Mez) van der Werff (Lauraceae) and/or of at least one of the constituents thereof as an insecticidal agent, in particular for controlling mosquito larvae, more particularly of the Culicidae genus, more particularly of the *Aedes* genus, most particularly of the *Aedes aegypti* mosquito species.

The present invention relates in particular to the public health, phytosanitary and agrochemistry fields.

In the description below, the references between ([ ]) refer back to the list of references provided at the end of the text.

Prior Art

The *Aedes aegypti* mosquito is an arthropod of the insect class, of the order Diptera and of the family Culicidae. It is today well established in tropical and subtropical regions, in particular in urban zones. Indeed, this domestic species, the females of which feed mainly on human blood, reproduces especially in man-made breeding places, that is to say in any vessel or container capable of retaining stagnant water (uncleaned gutters, waste tires, flowerpot dishes, etc.). The rainy season is very conducive to its development (Simmons et al., N. Engl. J. Med., 366: 1423-1432, 2012; OMS (WHO), Dengue et dengue hemorragique [Dengue and hemorrhagic dengue], http://www.who.int/mediacentre/factsheets/fs117/fr/, 2014) [1, 2].

This mosquito is considered to be one of the most significant disease vectors, in particular for the transmission of arboviral infections such as yellow fever or chikungunya. It is also the main vector of dengue. This disease is often benign although disabling, with symptoms similar to those of infectious diseases. However, in certain cases, it can present in a more serious form known as hemorrhagic dengue (1% of cases). The main endemic zones are South-East Asia and South America. The incidence of this vector-borne disease has been growing strongly over the past few decades, and more than 2.5 billion people, that is to say 40% of the worldwide population, are susceptible to contracting dengue. Each year, between 50 and 100 million people are infected throughout the world (WHO, 2014, previously cited) [2]. Imported cases of dengue and of chikungunya are also noted in metropolitan France, and monitoring is increasing in the south of the country, owing to the presence of the *Aedes albopictus* mosquito (or tiger mosquito), which is also a vector of these diseases.

There is currently no treatment or vaccine against dengue or chikungunya. The only means of controlling these diseases are antivector control and protecting individuals. Antivector control is carried out at two levels: destruction of the breeding places where the larvae are left or treatment thereof with a suitable insecticide, and controlling the adult mosquitoes (imagocide) via for example spraying inside and around homes.

The insecticides currently used against mosquitoes come from several origins: purely synthetic, such as propoxur (carbamate), dichlorvos (organochlorine) or malathion (organophosphorus); synthetic derived from a natural origin, such as pyrethrinoids (deltamethrin, cypermethrin, etc.); or of natural origin (pyrethrum, spinosad, Bti).

However, bulk and sometimes not well thought-out use of insecticides has led to the development of resistance in *Aedes aegypti* populations. On the worldwide scale, a first *Aedes aegypti* eradication campaign based on organochlorine insecticides, DDT (dichlorodiphenyltrichloroethane) and dieldrin, had been carried out in the 1940s. The campaign was successful in the regions of Southern Europe, of Africa and of North America treated with DDT. However, in the 1960s and 1970s, when the program was stopped, a gradual reinfestation of the territories was observed, the mosquitoes having developed resistance to this family of insecticides. This phenomenon was particularly observed in Guyana (Jansen and Beebe, Microbes Infect., 12(4): 272-279, 2010; Fouque and Carinci, Bull. Soc. Pathol. Exot. 89(2): 115-119, 1996) [10, 11].

Currently in Guyana, all of the mosquito populations are now resistant to deltamethrin, a pyrethrinoid used to control adult *Aedes aegypti*, and also to fenitrothion, an organophosphorus compound that is today banned (Dusfour et al., Mem. Inst. Oswaldo Cruz, 106: 346-352, 2011) [3].

The controlling of *Aedes aegypti*, the dengue vector in Guyana, is carried out by the departments of mosquito control of the departmental council of Guyana. It is based, with regard to antilarval control, on the treatment of breeding places where the larvae are left mechanically or chemically with a granulated formulation of *Bacillus thuringiensis* var *israelensis* or Bti (Vectobac® G). No resistance to Bti (a formulation of natural origin produced by the gram-positive bacterium *Bacillus thuringiensis* var. *israelensis* or Bti, the activity of which comes from the thuringiensin toxin), used in Guyana for larvicidal control, currently exists. However, this product has a very low persistence in the environment (15 days to 2 months depending on the organic matter load, exposure to UV, leaching, etc.), limiting its action over time and thus not making it possible to reliably predict its duration of action. Other larvicides have usage constraints in order to limit the effects on non-target species. This involves for example spinosad produced by *Saccharopolyspora spinosa* and consisting of two toxins (spinosyn A and D), but marketed with restrictions because of its high toxicity on bees. In addition, the use of pesticides, in particular synthetic products (such as organochlorine compounds such as DDT, organophosphorus compounds and carbamates) has caused other damage, in particular soil contamination by molecules that are too strongly persistent (for example chlordecone in the West Indies) and also harmful effects on non-target organisms (Regnault-Roger et al., Biopesticides d'origine végétale [Biopesticides of plant origin], Paris: Tec & Doc Lavoisier, 2008) [4]. These difficulties also affect the larvicidal substances, the number of which is decreasing. For example, dichlorvos has been judged to comprise an unacceptable risk to human health and the environment and will not be added to Annexes I, IA or IB of Directive 98/8/EC. The banning thereof took effect on May 1, 2013.

Thus, European regulations are year after year reducing the number of these molecules because of their toxicity or else through the non-renewal of their marketing authorizations (MAs). The last molecules authorized are pyrethrinoids. Larvicides are more diverse, including Bti, spinosad; methoprene, pyriproxifen (growth inhibitors), etc., but the persistence and the usage restrictions for some of them are not optimal for their use in anti-vector or anti-mosquito control; for others, the development of resistance has already been observed.

It is thus necessary to find new solutions with a view to replacing these insecticides, which overcome the deficiencies, drawbacks and obstacles of the prior art. In particular, substances that are more ecological, such as biopesticides, which are molecules derived from natural products such as plants or microorganisms, appear to represent a promising alternative.

For example, wood is a very competitive material compared with others: it is renewable, biodegradable, does not consume much energy during its conversion and it contributes to carbon storage. The exploitation of this raw material thus has advantages from an ecological and economic point of view. In particular, Sextonia rubra is a rather common forest species on the Guyana plateau, where it is known as "grignon franc" [Red Lourl], and in Brazilian Amazonia (Van der Weff, Novon, 7: 436-439, 1997) [5]. In Guyana, its wood is widely exploited in carpentry. It represents 9% of the log population in the departement. Generally, it is important to note that, between the felling and sawing, more than 50% of the ligneous material is lost, which represents a large amount of waste produced by the wood industry (Rodrigues, Analyse et valorisation bioinspiree des métabolites secondaires à l'origine de la durabilité naturelle des bois exploités de Guyana francaise [Analysis and biobased exploitation of secondary metabolites responsible for the natural durability of exploited wood from French Guyana], doctoral thesis, 2010) [6]. To date, only one termicidal activity with respect to Nasutitermes macrocephalus termites has been described for an extract of Sextonia rubra with ethyl acetate and also for a constituent thereof (rubrynolide) (Rodrigues et al., Pest. Manag. Sci., 67: 1420-1423, 2011) [7], and also a fungicidal activity with respect to wood fungi (patent application FR 2959642) [8]. However, these residuals from the forestry industry (or sawmill waste) are not currently exploited in Guyana.

DESCRIPTION OF THE INVENTION

The inventors have now demonstrated, entirely unexpectedly, novel products extracted from the Sextonia rubra wood species, that are insecticidal, in particular larvicidal, with respect to the Culicidae forming a family of insects commonly called mosquitoes, more particularly with respect to the Aedes genus, preferentially with respect to the Aedes aegypti species.

Thus, the ethyl acetate extract of Sextonia rubra and also the two constituents thereof (rubrenolide and rubrynolide) taken independently have demonstrated in the laboratory an excellent larvicidal activity with respect to the Aedes aegypti mosquito, with in particular an LD50 (median lethal dose) of 3.15 µg/ml at 24 h on the PAEA laboratory strain, and LD50s of 0.6 and 3.8 µg/ml for rubrenolide and rubrynolide, respectively, under this same strain.

There are many advantages with regard to the production and use of these novel agents that are insecticidal with respect to the mosquito: efficacy, renewable, better biodegradability in general, better $CO_2$ balance, no bioaccumulation in the food chain, no persistence in the environment and a very acceptable cost/performance ratio. In addition, these natural products do not cause excessive forestry exploitation since they can be prepared from forestry exploitation waste that is currently not exploited. A subject of the present invention is thus the use of a composition comprising an extract of Sextonia rubra or a constituent thereof (rubrenolide and/or rubrynolide) as an agent that is insecticidal with respect to the Culicidae (or mosquitoes), in particular as an agent that is larvicidal, more particularly with respect to mosquitoes of the Aedes genus, preferentially with respect to the Aedes aegypti species.

For the purposes of the present invention, the expression "agent that is insecticidal/larvicidal with respect to a mosquito strain" is intended to mean a compound which results in the death of the mosquito larvae placed in the presence of this compound, for example in the context of an in-cup trial carried out according to the protocol recommended by the WHO (Guidelines for Laboratory and Field Testing of Mosquito Larvicides, WHO/CDS/WHOPES/GCDPP/2005.13, 2005) [12], and for which, according to the WHO criteria for validating the tests, the mortality in the control batches is less than 20%.

According to one particular embodiment of the invention, for the purposes of the present invention, the term "extract of Sextonia rubra" is intended to mean a crude extract of Sextonia rubra or an extract comprising at least one constituent thereof, namely rubrynolide and/or rubrenolide, which can be used as an insecticidal agent in the context of the present invention.

Said sustainable Amazonian wood extracts are obtained from forestry exploitation waste using any appropriate solvent and method, including solvent extraction methods, or new extraction technologies ($CO_2$, supercritical, microwave, ultrasound, etc.). The extraction process is not critical, and can be selected by those skilled in the art according to the desired concentration of extractables and to the type of larvicidal product expected. Preferably, the sustainable Amazonian wood extracts are obtained by means of a solvent extraction process, preferentially using a polar solvent. For the purposes of the present invention, the term "polar solvent" is intended to mean a solvent which has a dipole moment other than zero, and in particular greater than 1.5. For example, the polar solvent is a protic solvent such as water or an alcohol (methanol, ethanol, etc.) or a mixture thereof, for example an aqueous-alcoholic mixture, or an aprotic solvent such as an ester (ethyl acetate, etc.).

For example, the extraction method used is maceration in a polar solvent (water; alcohol, for example methanol, ethanol; aqueous-alcoholic mixture; ester, for example ethyl acetate, etc.), for 12 to 72 hours, preferably for 24 hours, at a temperature from 22 to 27° C., preferably at ambient temperature (25° C.). To do this, a volume of 2 to 5 liters of solvent, preferably of approximately 3 liters of solvent is used for 300 to 1000 g of wood shavings, preferably for approximately 800 g of wood shavings.

According to one particular embodiment of the invention, the extract of Sextonia is an ethyl acetate extract.

A subject of the present invention is also a larvicidal treatment process, said process comprising the application of an effective amount of a composition comprising an extract of *Sextonia rubra*, rubrynolide and/or rubrenolide to breeding places where the larvae are left.

For the purposes of the present invention, the term "effective amount" is intended to mean a dose resulting in 100% mortality of the larvae studied, in order to prevent any development of resistance phenomena.

For example, the minimum concentration corresponding to an effective amount is thus 18 μg/ml (ppm) for the extract of *Sextonia rubra* in order to obtain 100% mortality at 24 h. With regard to rubrenolide, this value is 2 μg/ml at 24 h. With regard to rubrynolide, this value is 17 μg/ml at 24 h.

According to one particular embodiment of the process of the invention, the application is carried out by spraying. For example, the extract of *Sextonia rubra*, rubrynolide and/or rubrenolide is (are) dissolved in ethanol and then diluted in water until the desired concentration is obtained, and then these aqueous-alcoholic preparations are subsequently sprayed on to breeding places where the larvae are left.

It will be possible for other advantages to further emerge to those skilled in the art on reading the examples below.

EXAMPLES

Example 1

Preparation of Crude Extracts of *Sextonia Rubra*, from which the Constituents Thereof Are Extracted Ethyl Acetate Extract An ethyl acetate extract of *Sextonia rubra* was obtained according to the procedure previously described in Rodrigues et al. (2010, mentioned above) [6] by maceration, in the solvent, of wood previously dried at ambient temperature and milled.

To do this, the *Sextonia rubra* wood powder (200 g) was placed in an Erlenmeyer flask and extracted (3×500 ml of ethyl acetate) with stirring, at ambient temperature for 48 h. After each extraction, the solution was filtered, the solutions resulting from the various extractions were combined, and the solvent was evaporated off under reduced pressure at a temperature of 30° C. The yield obtained for the extract was 4.2%.

The extract (3.6 g) was then purified according to a method previously described in Rodrigues et al. (2010, mentioned above) [6], by chromatography with an open column of silica using ethyl acetate (600 ml) as eluent and then methanol (rinsing). The eluate obtained with the ethyl acetate was then evaporated (3.0 g of beige residue obtained), and triturated with hexane. The insoluble fraction was then recovered by filtration and dried under vacuum (316.6 mg). This fraction contains a mixture of rubrenolide and rubrynolide. The separation of the two constituents was then carried out according to the procedure described in Thijs and Zwanenburg (Tetrahedron, 60: 5237-5252, 2004) [9]. The mixture was dissolved in 6.5 ml of absolute ethanol. A silver nitrate solution (1 g in 15 ml of ethanol) was then added. The whole mixture was left to precipitate for 4 h. The precipitate (containing the rubrynolide to be purified) was then recovered by filtration and dried under vacuum. The filtrate was evaporated under reduced pressure so as to give the rubrenolide to be purified. The precipitate containing the rubrynolide was dissolved in 5 ml of sodium cyanide (NaCN) solution and the mixture was extracted with 10 ml of diethyl ether. The organic phase was dried with magnesium sulfate ($Mg_2SO_4$) and filtered, and the solvent was evaporated off under reduced pressure. The pure rubrynolide was thus obtained (21.6 mg). The dry residue obtained from the filtrate was taken up in 80 ml of MilliQ water and extracted with 80 ml of diethyl ether. The organic phase containing a yellow precipitate was recovered, filtered and, once clear, dried over magnesium sulfate before again being filtered. After the solvent had been evaporated off, 106.8 mg of pure rubrenolide were obtained.

The ethyl acetate used for the extraction does not exhibit any toxicity, the only risks noted being eye irritation, drowsiness or dizziness. The use of this solvent thus makes it possible to obtain an extract under good safety conditions. Finally, the yields of the crude extract >4%, of the rubrynolide extract of 0.6% and of the rubrenolide extract (the most active molecule) of 2.9% that were obtained make this extraction process by maceration a process that is simple to carry out and efficient in terms of yield, thereby making it possible to favorably envision a switch to the industrial scale with regard to the production of the extract and of the compounds thereof.

Alcoholic Extracts

Alcoholic extracts of *Sextonia rubra* were obtained by maceration, in methanol or ethanol, of wood previously dried at ambient temperature and milled.

To do this, *Sextonia rubra* wood shavings (200 mg) were macerated in 5 ml of each of the solvents chosen, at ambient temperature. The mixture was then placed in an ultrasonic bath for 4×15 minutes, and then centrifuged and filtered in order to recover the solution. The solvent was evaporated off under reduced pressure at a temperature of 30° C.

The extraction yields obtained for the various solvents are the following: ethanol, 4.6%; methanol, 5.1%. An ethyl acetate extract was obtained under the same conditions and an extraction yield of 4.2% was obtained.

The relative composition of the extracts resuspended in methanol was then analyzed by high performance liquid chromatography (HPLC) using a column of C18 type and a water/acetonitrile gradient supplemented with 0.1% of formic acid for the elution. By comparison with standards, the rubrenolide and rubrynolide were identified by means of a light scattering detector (ELSD), and the respective areas of the corresponding peaks were measured. This analysis made it possible to demonstrate that the extracts are virtually exclusively composed of these two compounds. The relative proportions of each of the compounds in the various extracts obtained were thus calculated. The following results were obtained:

|  | Relative proportions of the compounds (%) | |
| --- | --- | --- |
| Extracts | Rubrynolide | Rubrenolide |
| Ethanol | 69 | 28 |
| Methanol | 64 | 32 |
| Ethyl acetate | 70 | 27 |

The relative proportions of rubrynolide and rubrenolide in the three extracts are equivalent. Insofar as it has previously been demonstrated that this activity is associated with these two compounds, these extracts should exhibit equivalent larvicidal activities.

It should be noted that, even though methanol makes it possible to obtain a yield >5%, which is slightly higher than the other two solvents, it presents a risk of toxicity by inhalation, by skin contact or in the event of ingestion which requires additional precautions during handling thereof in the laboratory.

On the other hand, just like ethyl acetate, the ethanol used for the extraction does not present any major toxicity problems during handling in the laboratory, the only risks noted being eye irritation and drowsiness. The use of these solvents thus makes it possible to obtain extracts under good safety conditions. Finally, the yields of the crude extracts >4% and the proportions of rubrynolide and rubrenolide that were obtained make this extraction process by maceration a process that is simple to carry out and efficient, thereby making it possible to favorably envision a switch to the industrial scale with regard to the production of the extracts and of the compounds thereof.

Example 2

Insecticidal Activity of the Ethyl Acetate Extract of *Sextonia Rubra*, and of the Constituents Thereof The biological trials were carried out on larvae of *Aedes aegypti* mosquitoes of the PAEA laboratory strain sensitive to all insecticides. The protocol described hereinafter was adapted according to the WHO protocols.

This strain originating from French Polynesia has been maintained for about ten years at the insectarium of the Institut Pasteur of Guyana, in Cayenne. The mosquitoes were bred under natural conditions: temperature of 28° C.±2° C., humidity of 80%±20%, and daytime duration 12:12 h±20 min during the year. The *Aedes aegypti* eggs were kept dry on strips of blotting paper at the insectarium temperature. Hatching was carried out by placing these strips in water under a vacuum bell jar for at least 20 min. The larvae thus obtained were fed with yeast tablets. The larvae at growth stage 3-4 were then used for the extract and constituent activity tests. 100 larvae were transferred into plastic cups containing 99 ml of distilled water. Four cups per concentration (4×25 larvae) and at least 5 concentrations of each extract or constituent diluted in ethanol (crude extract of *Sextonia rubra*: 1, 2, 3, 4, 5, 7, 10, 25, 35, 50, 75, 100 µg/ml, rubrenolide: 0.1, 0.3, 0.5, 0.7, 1, 1.5, 2 µg/ml, rubrynolide: 0.1, 0.3, 0.5, 0.7, 1, 1.5, 4, 6, 8 µg/ml) were used to measure mortalities ranging from 0 to 100%. Each concentration of extract or of constituent (1 ml) was added to the cup. Controls were also carried out by adding 1 ml of ethanol to the cup. The mortality was evaluated at 24 h and 48 h after exposure of the larvae to the test product (crude extract, isolated constituent, ethanol).

The following mortality values (in µg/ml, ppm equivalent) were obtained:

Negative control [ethanol at 1% by volume (1 ml of ethanol added to 99 ml of water)]: mean mortality on 100 larvae: at 24 h, mean 0.63% (SE 0.52%), at 48 h mean 1.75% (SE 1.11%).

The values obtained, in particular for rubrenolide, are in the same range as those obtained for spinosad (LD50 at 24 h of 0.6 µg/ml for rubrenolide compared with 0.4 µg/ml for spinosad).

In comparison, in Guyana, anti-larval control is based on treating the breeding places mechanically or chemically with a granulated formulation of *Bacillus thuringiensis* var. *israeliensis* or Bti (Vectobac® G). This product was not tested in the context of the present study, but experiments carried out at the Institut Pasteur of Guyana have demonstrated for this formulation LD50 values at 24 h of 0.11 µg/ml and LD95 values at 24 h of 0.22 µg/ml, on the PAEA strain.

It emerges from the present study that the ethyl acetate extract of *Sextonia rubra* exhibits larvicidal activity, in particular with respect to the larvae of the *Aedes aegypti* mosquito. Furthermore, rubrenolide derived from the ethyl acetate extract of *Sextonia rubra* wood results in mortalities on the larvae of the PAEA strain of the same order of magnitude or better than those obtained for products known for their larvicidal activity, such as spinosad or Bti used as anti-larval treatment in Guyana.

LIST OF REFERENCES

1) Simmons et al., N. Engl. J. Med., 366: 1423-1432, 2012
2) OMS (WHO), Dengue et dengue hemorragique [Dengue and hemorrhagic dengue], http://www.who.int/mediacentre/factsheets/fs117/fd, 2014
3) Dusfour et al., Mem. Inst. Oswaldo Cruz, 106: 346-352, 2011
4) Regnault-Roger et al., Biopesticides d'origine végétale [Biopesticides of plant origin], Paris: Tec & Doc Lavoisier, 2008
5) Van der Weff, Novon, 7: 436-439, 1997
6) Rodrigues, Analyse et valorisation bioinspirée des métabolites secondaires àl'origine de la durabilité naturelle des bois exploités de Guyana francaise [Analysis and biobased exploitation of secondary metabolites responsible for the natural durability of exploited wood from French Guyana], doctoral thesis, 2010
7) Rodrigues et al., Pest. Manag. Sci., 67: 1420-1423, 2011
8) Patent application FR 2959642
9) Thijs and Zwanenburg, Tetrahedron, 60: 5237-5252, 2004
10) Jansen and Beebe, Microbes Infect., 12(4): 272-279, 2010
11) Fouque and Carincil, Bull. Soc. Pathol. Exot., 89(2): 115-119, 1996
12) OMS (WHO), Guidelines for Laboratory and Field Testing of Mosquito Larvicides, WHO/CDS/VVHOPES/GCDPP/2005.13, 2005

|  | At 24 h | | At 48 h | |
| --- | --- | --- | --- | --- |
| Extract/Constituent | LD50 (SE) | LD90 (SE) | LD50 (SE) | LD90 (SE) |
| *Sextonia rubra* | 3.150 (0.018) | 8.442 (0.029) | 2.062 (0.018) | 4.513 (0.022) |
| Rubrenolide | 0.605 (0.023) | 2.110 (0.041) | 0.300 (0.024) | 0.788 (0.027) |
| Rubrynolide | 3.840 (0.018) | 8.909 (0.031) | 2.105 (0.023) | 8.200 (0.043) |
| Dichlorvos | 0.039 (0.012) | 0.064 (0.026) | 0.029 (0.012) | 0.049 (0.020) |
| Spinosad | 0.387 (0.025) | 1.118 (0.065) | 0.193 (0.020) | 0.444 (0.028) |

The invention claimed is:

1. A larvicidal treatment process, said process comprising applying an effective amount of a composition comprising a crude extract of *Sextonia rubra*, rubrynolide, and/or rubrenolide to a breeding place of larvae, wherein said larvae is mosquito larvae chosen from the Culicidae family.

2. The process as claimed in claim 1, wherein the application is carried out by spraying.

3. The process of claim 1, wherein the mosquito strain is of the *Aedes* genus.

4. The process of claim 3, wherein the mosquito strain is of *Aedes aegypti* species.

5. The process of claim 1, wherein the composition comprises an ethyl acetate extract of *Sextonia rubra*.

* * * * *